(12) United States Patent
Johnson et al.

(10) Patent No.: US 8,562,941 B2
(45) Date of Patent: Oct. 22, 2013

(54) PERTURBED SYNTHESIS OF MATERIALS

(75) Inventors: Ivy D. Johnson, Lawrenceville, NJ (US); Hilda B. Vroman, Piscataway, NJ (US); Simon C. Weston, Annandale, NJ (US); Larry M. Stevens, Rahway, NJ (US)

(73) Assignee: Exxonmobil Research and Engineering Company, Annandale, NJ (US)

( * ) Notice: Subject to any disclaimer, the term of this patent is extended or adjusted under 35 U.S.C. 154(b) by 787 days.

(21) Appl. No.: 11/637,347

(22) Filed: Dec. 12, 2006

(65) Prior Publication Data

US 2007/0154387 A1    Jul. 5, 2007

Related U.S. Application Data

(60) Provisional application No. 60/751,876, filed on Dec. 20, 2005.

(51) Int. Cl.
| | |
|---|---|
| *C01B 33/36* | (2006.01) |
| *C01B 39/02* | (2006.01) |
| *C01B 39/04* | (2006.01) |
| *C01F 7/00* | (2006.01) |

(52) U.S. Cl.
USPC ............ 423/700; 423/701; 423/703; 423/702

(58) Field of Classification Search
USPC .................................................. 423/700–718
See application file for complete search history.

(56) References Cited

U.S. PATENT DOCUMENTS

| | | | |
|---|---|---|---|
| 3,733,390 A | 5/1973 | Robson | |
| 3,852,411 A | 12/1974 | Maness | |
| 4,247,524 A | 1/1981 | Leonard | |
| 4,310,440 A | 1/1982 | Wilson et al. | |
| 4,401,633 A | 8/1983 | Sun | |
| 4,440,871 A | 4/1984 | Lok et al. | |
| 4,503,024 A * | 3/1985 | Bourgogne et al. | ............ 423/709 |
| 4,650,655 A * | 3/1987 | Chu et al. | ............. 423/709 |
| 4,703,025 A | 10/1987 | Kokotailo et al. | |
| 4,717,560 A | 1/1988 | Vaughan | |
| 5,160,500 A | 11/1992 | Chu et al. | |
| 5,187,132 A | 2/1993 | Zones et al. | |

(Continued)

FOREIGN PATENT DOCUMENTS

| | | |
|---|---|---|
| GB | 2160517 B | 12/1985 |
| WO | 9100844 A | 1/1991 |
| WO | 9115427 A1 | 10/1991 |
| WO | 9619423 A1 | 6/1996 |

OTHER PUBLICATIONS

Ahedi et al., "Synthesis of [Al]-SSZ-31 molecular sieves using [Al]-beta zeolite ([Al]-BEA) as precursors", Bulletin of the Chemical Society of Japan 76/5, pp. 883-890, (2003) ISSN: 0009-2673.

(Continued)

*Primary Examiner* — Bijay Saha
(74) *Attorney, Agent, or Firm* — David M. Weisberg

(57) ABSTRACT

The present invention is a method that perturbs the initial crystallization of a material from a less desired phase into a more desired phase. More specifically, the present invention is a method to form a different crystallization of a zeolite, mesoporous material, $SAPO_4$, $AlPO_4$ or porous inorganic oxide after the hydrothermal synthesis has started and a precursor crystalline phase has formed.

7 Claims, 2 Drawing Sheets

X-ray Diffraction Pattern of MCM-68 Product from Example 1.

(56) References Cited

U.S. PATENT DOCUMENTS

| | | | |
|---|---|---|---|
| 5,225,179 | A | 7/1993 | Zones et al. |
| 5,340,563 | A * | 8/1994 | Zones et al. ............... 423/706 |
| 5,389,358 | A | 2/1995 | Wu et al. |
| 5,582,713 | A | 12/1996 | Wu et al. |
| 5,626,828 | A | 5/1997 | Wu et al. |
| 5,695,735 | A | 12/1997 | Benazzi et al. |
| 5,772,979 | A * | 6/1998 | Araya ....................... 423/700 |
| 5,935,551 | A | 8/1999 | Davis et al. |
| 5,972,204 | A | 10/1999 | Corma Canos et al. |
| 6,049,018 | A * | 4/2000 | Calabro et al. ............ 585/446 |
| 6,080,382 | A | 6/2000 | Lee et al. |
| 6,103,215 | A | 8/2000 | Zones et al. |
| 6,187,283 | B1 | 2/2001 | Chiyoda et al. |
| 6,324,200 | B1 | 11/2001 | Kamiyama et al. |
| 6,342,200 | B1 | 1/2002 | Rouleau et al. |
| 6,436,364 | B1 * | 8/2002 | Chiyoda et al. ............ 423/700 |
| 6,471,940 | B1 | 10/2002 | Kurata et al. |
| 6,514,479 | B1 | 2/2003 | Merlen et al. |
| 6,649,141 | B2 * | 11/2003 | Camblor Fernandez et al. ....................... 423/706 |

OTHER PUBLICATIONS

Zones et al., "Use of modified zeolites as reagents influencing nucleation in zeolite synthesis", Studies in Surface Science and Catalysis (1995), 97 (Zeolites: A Refined Tool for Designing Catalytic Sites), pp. 45-52 ISSN: 0167-2991.

Zones et al., "Boron-beta zeolite hydrothermal conversions: The influence of template structure and of boron concentration and source", Microporous Materials (1994), 2(6), pp. 543-555 ISSN: 0927-6513.

Zones et al., "An unexpected and highly versatile new zeolite synthesis route leading to large pore alumino and borosilicate sieves", Proc. Int. Zeolite Conf., 9th (1993), Meeting Date 1992, vol. 1, pp. 163-170.

Cormier et al., "Synthesis and metastable phase transformations of sodium-, sodium, potassium- and potassium-ferrierites", American Mineralogist (1976), 61 (11-12), 1259-66 ISSN: 0003-004X.

Liebau et al., "Classification of tectosilicates and systematic nomenclature of clathrate type tectosilicates: a proposal." Zeolites, vol. 6, 373, 1986.

C. Moloy et al., "High-silica zeolites: a relationship between energetics and internal surface areas", Micro Meso Mat., vol. 54, 1-2, Jul. 1, 2002, pp. 1-13; ISSN: 1387-1811.

Flanigen et al., "Aluminophosphate Molecular Sieves and the Periodic Table." Proc. 7th Intl. Zeolite. Conf., p. 103, 1985 / 1986.

* cited by examiner

Figure 1 - X-ray Diffraction Pattern of MCM-68 Product from Example 1.
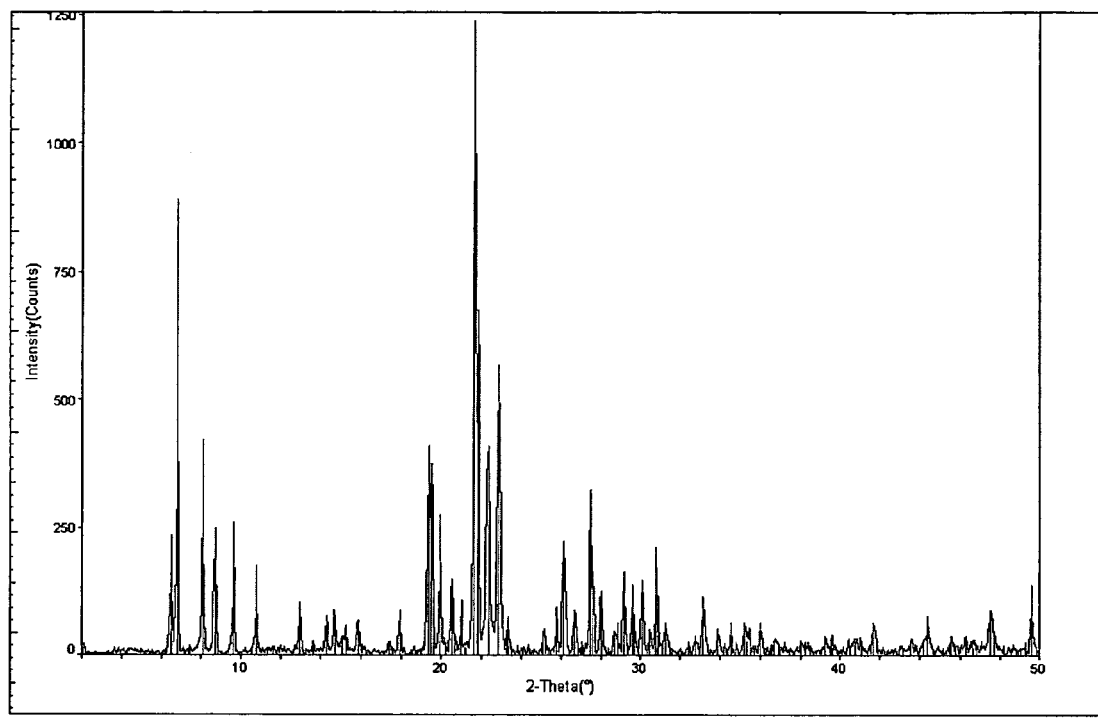

Figure 2 - Scanning Electron Micrographs of the crystalline (a) Ferrierite precursor and the (b)MCM-68 product produced from Example 1.
(a) Ferrierite precursor
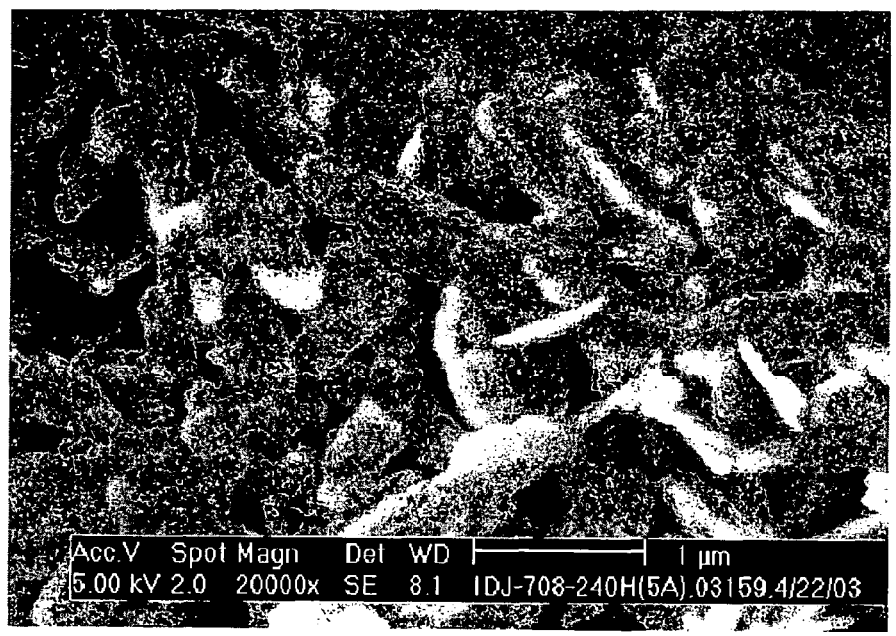
(b)MCM-68 product
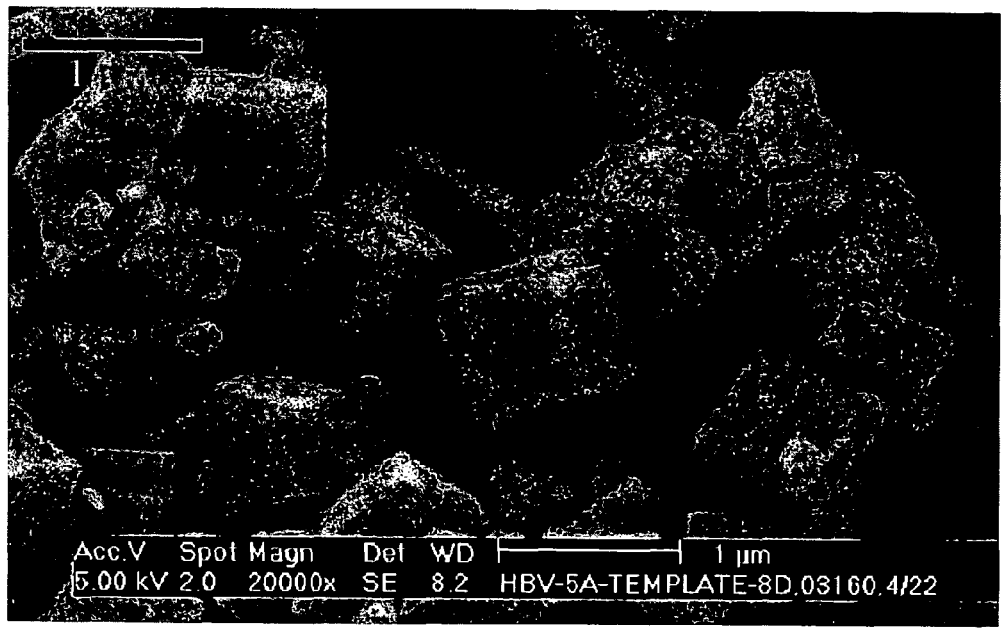

PERTURBED SYNTHESIS OF MATERIALS

This application claims the benefit of U.S. Provisional application 60/751,876 filed Dec. 20, 2005.

BACKGROUND OF THE INVENTION

The family of materials known as zeolites constitute a large group of silicates having appreciable void volume within their structures. In the ideal state they may be viewed as built from corner shared $SiO_4$ tetrahedral building units which form a large range of architectures comprising cavities, channels and cages. In the pure silica forms the structures are charge neutral frameworks stuffed with either neutral molecules, usually water or other neutral solvent molecules, or salt pairs, such as NaCl. These pure silica forms have been designated "clathrasils" or "zeosils" (Liebau et al., Zeolites, v. 6, 373, 1986). More commonly Al substitutes for some of the silica, in which case the framework possesses a net negative charge which is balanced by "exchangeable" cations-commonly those of Groups 1 and 2 of the Periodic Table (Kirk-Othmer Encyclopedia of Chemical Technol., J. Wiley (New York), v. 8, 94, 1965). However, numerous substitutions are now recognized as being possible both in the Si framework substituents and the exchangeable cations, as demonstrated in much of the recent art. A major expansion of these structural types has been achieved with the recognition that $AlPO_4$ has many structures beyond the well known silica analogues of quartz-tridymite—cristobalite (Flanigen et al., Proc. 7th Intl. Zeolite. Conf., Ed. Murakami et al., Kodansha/Elsevier (Tokyo), p. 103, 1985). Many zeolites occur as minerals (Tschemich, "Minerals of the World", Geoscience Press (Phoenix, Ariz.) 1992), some of which have no synthetic counterparts. Similarly many synthetic zeolites have no naturally occurring counterparts. The large number of existing known structures has been reviewed by Meier and Olson ("Atlas of Zeolite Structures", Butterworths-Heinemann Press (London), 1992). The unique catalytic, sorption and ion-exchange properties of these zeolite "molecular sieves" have been utilized in many industrial and environmental processes, and numerous consumer products. (As reviewed in the periodic Proceedings of the International Zeolite Conferences).

There are a large number of synthetic methods for producing zeolites, well illustrated in the patent literature and reviewed by Barrer (in "Hydrothermal Chemistry of Zeolites", Academic Press (London), 1982), Breck (in "Molecular Sieve Zeolites", J. Wiley (New York), 1974) and Jacobs and Martens (in "Synthesis of High Silica Alumino-silicate Zeolites.", Elsevier (Amsterdam), 1987). Reactants may be general or specific and typical reaction conditions are below about 250.degree. C. and 50 bars pressure. The primary solvent is usually water, but others, such as ammonia (e.g., U.S. Pat. No. 4,717,560) and organic liquids (e.g., U.S. Pat. No. 5,160,500), have also been used. Methods for controlling the zeolite type produced, and its composition, include "seeds" as nucleation centers and organic molecules (frequently alkylammonium salts) as structural "templates".

The prior art includes two standard methods for materials processing for either crystallization or precipitation. The first is the standard autoclave crystallization process using commercially available equipment in a batch operation. This is the preferred approach to crystallizing microporous and mesoporous materials. The reaction mixture is stirred to assure uniform composition of the product. The finished product is typically washed, sent through a filtration system, and then dried for further processing. A second approach is a continuous precipitation process, producing a product that again requires filtration prior to further handling.

The present invention concerns a novel process for the synthesis of zeolites, aluminophosphates, and mesoporous solids. More precisely, the present invention describes a unique two-phase synthesis technique of a zeolite, microporous material or macroporous material by first crystallizing a crystalline phase precursor and then introducing a recrystallization agent to recrystallize the precursor into a second different crystalline phase Another family of crystalline microporous compositions known as molecular sieves, which exhibit the ion-exchange and/or adsorption characteristics of zeolites are the aluminophosphates, identified by the acronym $AlPO_4$, and substituted aluminophosphates as disclosed in U.S. Pat. Nos. 4,310,440 and 4,440,871. U.S. Pat. No. 4,440,871 discloses a class of silica aluminophosphates, which are identified by the acronym SAPO and which have different structures as identified by their X-ray diffraction pattern. The structures are identified by a numerical number after $AlPO_4$, $SAPO_4$, $MeAPO_4$ (Me=metal), etc. (Flanigen et al., Proc. 7th Int. Zeolite Conf., p. 103 (1986) and may include Al and P substitutions by B, Si, Be, Mg, Ge, Zn, Fe, Co, Ni, etc. The present invention is a new molecular sieve having a unique framework structure.

ExxonMobil and others extensively use various microporous materials, such as faujasite, mordenite, ZSM-5, MCM-41 and MCM-68 in many commercial applications. Such applications include reforming, cracking, hydrocracking, alkylation, oligomerization, dewaxing and isomerization. Any new or modified material has the potential to improve the catalytic performance over those catalysts presently employed.

Since zeolites are metastable compounds, the nature of the zeolite formed from a gel depends not only on conventional thermodynamic parameters (overall composition of the gel, temperature, pressure) but also on kinetic factors linked to the reactivity of the gel. This gel reactivity, which partially determines the degree of supersaturating achieved in the liquid phase, is a function of the method used to prepare the gel, the nature of the starting materials used, and the nature of any materials added during synthesis. In conventional synthesis of molecular sieves, the gel composition is defined at the very early state when the synthesis gel is prepared. However, there has not been an intentional perturbation of the gel composition after a first crystal phase has formed in the gel.

It has long been known to use an existing zeolite as the raw material for a new synthesis gel. See for example U.S. Pat. No. 6,080,382 or U.S. Pat. No. 5,935,551. A disadvantage to this approach is that it requires processing of the initial crystalline phase. Such processing involves separation of the crystalline product from the reaction gel through mechanical means such as filtration. The crystalline materials are then washed, possibly ion exchanged and possibly calcined to remove organic structure directing agents used in the initial crystallization. These auxiliary steps dramatically increase the cost of using zeolites or other crystalline phases as raw materials for use in producing other crystalline materials. The method described herein does not require separation of the initial crystalline phase or any additional processing of it as a raw material. It allows for the properties of the initial raw materials to be incorporated into the final, desired crystalline phase.

Similarly, it has been well known to introduce a zeolite during the synthesis process as a seed to start a synthesis of that type of zeolite. See, for example, U.S. Pat. No. 6,324,200 B1. There are also references to using seeds of one type of zeolite to facilitate the crystallization of a different, unrelated zeolite. However, the quantity of seeds is typically <5% by weight, perhaps as high as 10% by weight. In the aforementioned prior art, the reactants are all added prior to any hydrothermal synthesis, including the zeolite precursor, seeds, and any templates.

Another well-known process is the introduction of seeds to promote the crystallization of microporous and mesoporous materials. In that process, a beta zeolite is used as a seed in the original preparation with the goal of substituting one element for another in the zeolite crystal. See, for example, U.S. Pat. No. 5,972,204 or 6,103,215.

Some prior art has considered adding materials to the preparation during the synthesis process. In a standard example of a well known technique Benazzi, et al., teach in U.S. Pat. No. 5,695,735 a technique of continuously adding an acidic chemical agent to promote the condensation (and later crystallization) of MFI, OFF and beta zeolites. Wu, et al., teach in U.S. Pat. No. 5,389,358 a method of adding a reagent in a slow and controlled manner during the hydrothermal synthesis in order to purify and promote the original crystal structure. Neither of these patents teaches a method to recrystallize an initial crystalline phase after it has formed during the hydrothermal synthesis process to achieve a second crystalline phase. The current invention is significantly different from the prior art in that it teaches a method of perturbing the original crystal structure after it has completely formed in the hydrothermal synthesis process.

One type of material of interest for use with the current invention is ferrierite. Ferrierite is a natural occurring and well known zeolite characterized as layers of 5-rings which condense to form a 2-dimensional pore structure comprised of intersecting 8 and 10 membered ring channels. Synthetic forms of ferrierite are also well known in the literature.

Prior art suggests that conversion between zeolites, can be effected only by converting a zeolite with a relatively lower framework density to one of a relatively higher framework density (U.S. Pat. No. 6,436,364). The method disclosed herein demonstrates that with the proper manipulation of the synthesis process, zeolites can be converted to other zeolites with either a higher or a lower framework density. Examples described herein will demonstrate conversion of Ferrierite to MCM-68 or beta as well as beta to MCM-68. An example of discussions on energetics, at least for high silica zeolites, can be found in: Eric C. Moloy et al, "High-silica zeolites: a relationship between energetics and internal surface areas "Micro Meso Mat., Vol 54, 1-2, 1 Jul. 2002, Pages 1-13.

| Zeolite | Framework Density, T Atoms/1000 Å |
|---|---|
| Ferrierite | 17.7 |
| MCM-68 | 16.6 |
| Beta | 15.3 |
| ZSM-12 | 18.2 |

SUMMARY OF THE INVENTION

The present invention is a method that perturbs an initial crystallization phase into a more desired phase. More specifically, the present invention is a method to form a different crystallization phase of a zeolite, mesoporous material, $SAPO_4$, $AlPO_4$ or porous inorganic oxide after the hydrothermal synthesis has produced a precursor crystalline phase material. Even more specifically, one embodiment of the present invention is a method to perturb the crystallization of a ferrierite to MCM-68. A second embodiment of the present invention is to perturb the crystallization of beta to MCM-68.

BRIEF DESCRIPTION OF THE DRAWINGS

FIG. 1 X-ray Diffraction Pattern of MCM-68 Product from Example 1.

FIG. 2 Scanning Electron Micrographs of the crystalline Ferrierite precursor and the MCM-68 product produced from Example 1.

DETAILED DESCRIPTION OF THE PREFERRED EMBODIMENTS

The present invention is an unexpectedly new method for transforming a material, during the hydrothermal synthesis process, from an initial crystal phase to a second, different crystal phase. The current invention, named "perturbed synthesis", provides a method to transform the crystallization of one material into a second more desired material.

Clearly, perturbation of a zeolite precursor into a different crystalline form would have many advantages over current methods of producing zeolites and other microporous and mesoporous materials. Many zeolites are limited in their applications due to limits in composition and/or morphology. In one aspect of the current invention, this invention is a method to remove undesired crystalline products or to use a desired precursor to direct the synthesis to a second, more desired phase. The present invention offers a synthesis platform that one of ordinary skill in the art instantly recognizes will produce many new forms of zeolites and provide attractive new methods for producing known zeolites.

Recrystallizing agents that may be used in the present invention include organic structure directing agents, organic template salts, alkali metal hydroxides or alkaline earth metal hydroxides, mineralizers, acidic pH modifiers, basic pH modifiers, and a combination of organic or inorganic reagents. Alkali metal and alkaline earth metal hydroxides can include the hydroxides of sodium, potassium, lithium, cesium, rubidium, calcium, and magnesium; mineralizers can include hydrogen fluoride; acidic pH modifiers can include $H_2SO_4$, $HNO_3$, and $H_3PO_4$; and, basic pH modifiers can include $NH_4OH$ and organic amines. Preferably, the recrystallizing agent is N,N,N'N'-Tetraethylbicyclo[2.2.2]oct-7-ene-2,3:5,6-dipyrrolidinium Diiodide.

In another aspect of the invention, there is provided a method to remove impurities from zeolite crystallizations. Impurities may be removed by preparing an initial reactant gel for forming a precursor crystalline phase for the zeolite, macroporous or microporous catalyst. The reactant gel is allowed to crystallize until the precursor crystalline phase is dominant yet incorporates trace crystalline impurities. A recrystallization agent is then introduced to remove trace crystalline phase. The precursor crystalline phase is not separated from the reactant gel prior to introducing the recrystallization agent. The completion of the crystallization of a second different crystalline phase is allowed. The zeolite, mesoporous material or microporous material is then recovered.

In one embodiment, the present invention consists of a method to produce zeolites, mesoporous catalysts or microporous catalysts by
   (a) preparing an initial reactant gel that forms a precursor crystalline phase for said zeolite, macroporous or microporous catalyst;
   (b) allowing said reactant gel to crystallize until said precursor crystalline phase is dominant;

(c) rapidly introducing a recrystallization agent to form a second crystalline phase;
(d) allowing completion of the crystallization of the second crystalline phase;
(e) recovering said zeolite, mesoporous material or microporous material
(f) while the initial reactant gel may contain an initial crystallization template, it is not necessary for the operation of the present invention.

In another embodiment, the present invention may be described as a method for crystallizing a zeolite, mesoporous material, microporous material, $SAPO_4$, $AlPO_4$, or porous inorganic oxide after the initial hydrothermal reaction has been started and after a precursor crystalline material has formed through the introduction of a reagent(s). The added reagent(s) affects a recrystallization of the initial crystalline material into an altogether different structure. The initial crystalline phase is not separated from the synthesis liquor prior to introducing the second recrystallizing agent(s).

At no time is the precursor phase separated from the reaction mixture. Once the desired, final zeolite crystals have formed, the solid product is separated from the reaction mixture by standard mechanical separation techniques such as filtration.

The present invention is sensitive to the reactants and conditions as the following examples show.

Example 1

Crystallization of MCM-68 Through Ferrierite (IDJ-708)

A reactant gel was produced composed as follows: 46.78 g water, 29.82 g colloidal silica (Ludox SM-30), 1.29 g Al(OH)$_3$, and 13.7 g of a 20% by weight KOH solution. The gel was divided into 8 autoclaves, loaded into the tumbling oven and rotated at 60 RPMs while at 160° C. After 240 hours, a sample was removed for analysis. This product was identified as ferrierite by X-ray diffraction. The measured K/SiO$_2$ molar ratio of the ferrierite was 0.109. 1.1 g of N,N,N',N'-Tetraethylbicyclo[2.2.2]oct-7-ene-2,3:5,6-dipyrrolidinium Diiodide ("diquat") was added to the remaining slurries. One of the crystallizations at 160° C. was continued in the tumbling autoclave for 8 days. The final product was removed and analyzed and identified by x-ray diffraction as MCM-68 (See FIG. 1). Scanning electron micrographs were taken of the intermediate sample showing the morphology of the crystalline ferrierite precursor. (See FIG. 2). Included in FIG. 2 are the scanning electron micrographs taken of the final crystalline product showing the morphology of the MCM-68 to be cubes, of approximately 1 μm by 1 μm.

This perturbed method also surprisingly creates larger crystals of MCM-68.

Example 2

Crystallization of MCM-68 and β Though Ferrierte

A reactant gel identical to that in Example 1 was produced as a repetition. The measured K/SiO$_2$ molar ratio of the ferrierite in this run was 0.124. The final product after addition of the Diquat was identified as a mixture of beta and MCM-68. This demonstrates the sensitivity of the MCM-68 synthesis to reactant gel composition.

Example 3

Sensitivity of Reactant Gel

Comparative example exploring the sensitivity of the reactant gel to the amount of KOH present was produced. A reactant gel was produced composed as follows: 230 g water, 146 g colloidal silica (Ludox SM-30), 6.8 g Al(OH)$_3$, and 76.7 g of a 20% by weight KOH solution. The targeted K/SiO$_2$ molar ratio was calculated at 0.367. The gel was divided into 6 autoclaves, loaded into the tumbling oven and rotated at 60 RPMs while at 160° C. After periods of time of 24, 48, 96, 192, and 360 hours, samples were taken and identified. At times greater than 48 hours, dense KSiO$_2$ phases and quartz were observed, no ferrierite was observed at any time. The 2 g of N,N,N',N'-Tetraethylbicyclo[2.2.2]oct-7-ene-2,3:5,6-dipyrrolidinium Diiodide was added to the slurries. The crystallizations at 160° C. were continued in the tumbling autoclaves for up to 8 days. The final products were removed and analyzed by x-ray diffraction. The 24 and 48 hour gels that had not crystallized into the dense phase as a precursor crystallized into ZSM-12 and Mordenite, respectively.

What is claimed is:

1. A method for preparing synthetic MCM-68 zeolite product, comprising the steps of:
    a) preparing an initial reactant gel for forming a precursor crystalline phase for said zeolite;
    b) allowing said reactant gel to crystallize until said precursor crystalline phase is dominant;
    c) introducing a structure directing agent to transform said precursor crystalline phase into a second different crystalline phase;
    d) allowing completion of the crystallization of the second crystalline phase; and
    e) recovering said zeolite, wherein said precursor crystalline phase is not separated from said reactant gel prior to introducing said structure directing agent.

2. The method of claim 1 where the structure directing agent is chosen from a group of diquats.

3. The method of claim 1 wherein the structure directing agent is N,N,N',N'-Tetraethylbicyclo[2.2.2]oct-7-ene-2, 3:5, 6-dipyrrolidinium Diiodide.

4. The method of claim 1 wherein said initial reactant gel is template free.

5. The method of claim 1 wherein said initial reaction reactant gel utilizes a template different from said structure directing agent.

6. The method of claim 1 wherein said precursor crystalline phase is predominantly ferrierite.

7. The method of claim 1 wherein said precursor crystalline phase is predominantly beta.

* * * * *